United States Patent
Thelen et al.

(10) Patent No.: US 7,711,914 B2
(45) Date of Patent: May 4, 2010

(54) DEBUGGING USING VIRTUAL WATCHPOINTS

(75) Inventors: Greg William Thelen, Fort Collins, CO (US); Robert Campbell, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 821 days.

(21) Appl. No.: 11/169,235

(22) Filed: Jun. 28, 2005

(65) Prior Publication Data
US 2006/0294432 A1    Dec. 28, 2006

(51) Int. Cl.
G06F 12/14    (2006.01)
G06F 11/36    (2006.01)

(52) U.S. Cl. .......................... 711/163; 717/129
(58) Field of Classification Search .......... 711/152, 711/163
See application file for complete search history.

(56) References Cited

U.S. PATENT DOCUMENTS

| | | | |
|---|---|---|---|
| 5,257,358 A * | 10/1993 | Cohen | 714/38 |
| 5,440,710 A | 8/1995 | Richter et al. | |
| 5,598,553 A | 1/1997 | Richter et al. | |
| 5,611,043 A | 3/1997 | Even et al. | |
| 5,987,626 A | 11/1999 | Greyzck | |
| 6,321,329 B1 * | 11/2001 | Jaggar et al. | 712/227 |
| 6,480,818 B1 | 11/2002 | Alverson et al. | |
| 6,769,116 B1 | 7/2004 | Sexton | |
| 6,829,701 B2 | 12/2004 | Roth et al. | |
| 2003/0084375 A1 | 5/2003 | Moore et al. | |
| 2004/0003324 A1 | 1/2004 | Uhlig et al. | |
| 2006/0252406 A1 * | 11/2006 | Fey et al. | 455/403 |

FOREIGN PATENT DOCUMENTS

JP    08030485 A  *  2/1996

OTHER PUBLICATIONS

Wahbe R: "Efficient Data Breakpoints" ACM Sigplan Notices, ACM, Association For Computing Machinery, New York, NY, US, vol. 27, No. 9, Sep. 1, 1992 pp. 200-212 XP000330601.

* cited by examiner

*Primary Examiner*—Matt Kim
*Assistant Examiner*—Michael C Krofcheck

(57) ABSTRACT

A method is provided for use in a computer system for: (A) receiving notification of a virtual memory trap; (B) determining whether the virtual memory trap was triggered by an access to a region of memory identified as protected against access; (C) if it is determined that the virtual memory trap was triggered by an access to a region of memory identified as protected against access, determining whether the virtual memory trap was triggered by computer program code identified as suspect; and (D) if it is determined that the virtual memory trap was triggered by computer code identified as suspect, signaling a fault to a debugger executing on the computer system.

18 Claims, 5 Drawing Sheets

| CODE BLOCK | REGION ACCESSED? | CODE SUSPECT? | WATCHPOINT TRIGGERED? |
|---|---|---|---|
| A | N | Y | N |
| B | Y | N | N |
| C | Y | Y | Y |

FIG. 4

DEBUGGING USING VIRTUAL WATCHPOINTS

CROSS REFERENCE TO RELATED APPLICATIONS

This application is related to a commonly owned and concurrently filed U.S. patent application entitled "Debugging Using Watchpoints," which is hereby incorporated by reference.

BACKGROUND

Debugging computer programs can be tedious and time-consuming, in part because the program code responsible for a bug can be difficult to find. A serious software bug may be caused by a single instruction among millions of instructions in a computer program. Such an instruction may be difficult or prohibitively costly to find by manually inspecting every instruction in the program. As a result, software programs known as "debuggers" have long been used to facilitate the process of debugging.

One useful feature of conventional debuggers is the ability to execute a program until the program accesses a predetermined memory location. When the program accesses the predetermined memory location, the debugger halts execution of the program. This feature may be useful when it is suspected that the program is storing an incorrect value in the memory location or otherwise accessing the memory location in a way that is causing the program to malfunction. Halting execution of the program at this point enables the programmer to inspect the contents of the predetermined memory location in an attempt to identify the source of the bug being investigated.

Modern microprocessors typically include special "watchpoint registers" provided specially for use by debugger software in the circumstances described above. To execute a program until a predetermined range of memory locations is accessed, the debugger stores the range of addresses in a pair of watchpoint registers and then executes the program. When the program accesses a memory location in the predetermined range, a "watchpoint trap" is generated, which causes control to pass to the debugger. Providing this functionality directly in the hardware of the microprocessor enables programs being debugged to be executed much more rapidly than if such functionality were implemented in software. The number of watchpoints, however, is limited by the number of watchpoint registers in the processor.

SUMMARY

A method is provided for use in a computer system for: (A) receiving notification of a virtual memory trap; (B) determining whether the virtual memory trap was triggered by an access to a region of memory identified as protected against access; (C) if it is determined that the virtual memory trap was triggered by an access to a region of memory identified as protected against access, determining whether the virtual memory trap was triggered by computer program code identified as suspect; and (D) if it is determined that the virtual memory trap was triggered by computer code identified as suspect, signaling a fault to a debugger executing on the computer system.

Other features and advantages of various aspects and embodiments will become apparent from the following description and from the claims.

BRIEF DESCRIPTION OF THE DRAWINGS

FIG. 4 is a table illustrating the effect of using the method of FIG. 2 to facilitate debugging according to one embodiment.

DETAILED DESCRIPTION

As described above, modern microprocessors typically include only a limited number of watchpoint registers for use by debugger software. The number of watchpoint registers limits the number of watchpoints that can be enabled and therefore limits the number of memory regions that can be monitored using watchpoints. If, for example, a microprocessor has two pairs of watchpoint registers, then only two memory regions may be monitored by watchpoints. It may be desirable, however, to monitor accesses to more than the number of regions that can be monitored by the hardware-supported watchpoints.

Embodiments provide techniques for effectively providing watchpoint protection for a greater number of memory regions than is directly supported by the microprocessor's watchpoint registers. In general, and as will be described in more detail below, such extended watchpoint protection is provided for one or more memory regions by modifying the virtual memory protection of those regions to disallow access to them. When a virtual memory protection trap is signaled to the operating system fault handler, the fault handler may determine whether the trap was triggered by an access to a region of memory for which virtual memory protection has been modified. If so, the operating system fault handler may signal a fault to a debugger program, which may then be used in an attempt to identify the source of the bug, if any, that caused the previously-observed memory corruption. Because the virtual memory protection for any number of memory regions may be modified in this way, an unlimited number of "virtual watchpoints" may be generated using the technique just described.

Furthermore, if certain portions of program code are not suspected of containing the bug under investigation, such non-suspect code may be registered with the operating system fault handler. Then, when a virtual memory trap is signaled to the fault handler, the fault handler may determine whether the trap was triggered by computer program code previously registered as non-suspect. If non-suspect code triggered the trap, the fault handler does not signal a fault to the debugger program. This technique avoids halting execution of the program and signaling a fault to the debugger if it is believed or known that the memory access was performed by code that does not contain the bug under investigation.

The two techniques just described—modifying virtual memory protection and registering non-suspect code—may be combined with each other, so that only memory accesses by suspect code to memory whose virtual memory protection has been modified cause a fault to be signaled to the debugger program. This ensures that program execution is not halted when it is unnecessary to bring a memory access to the attention of the (human) debugger.

Figure 1:
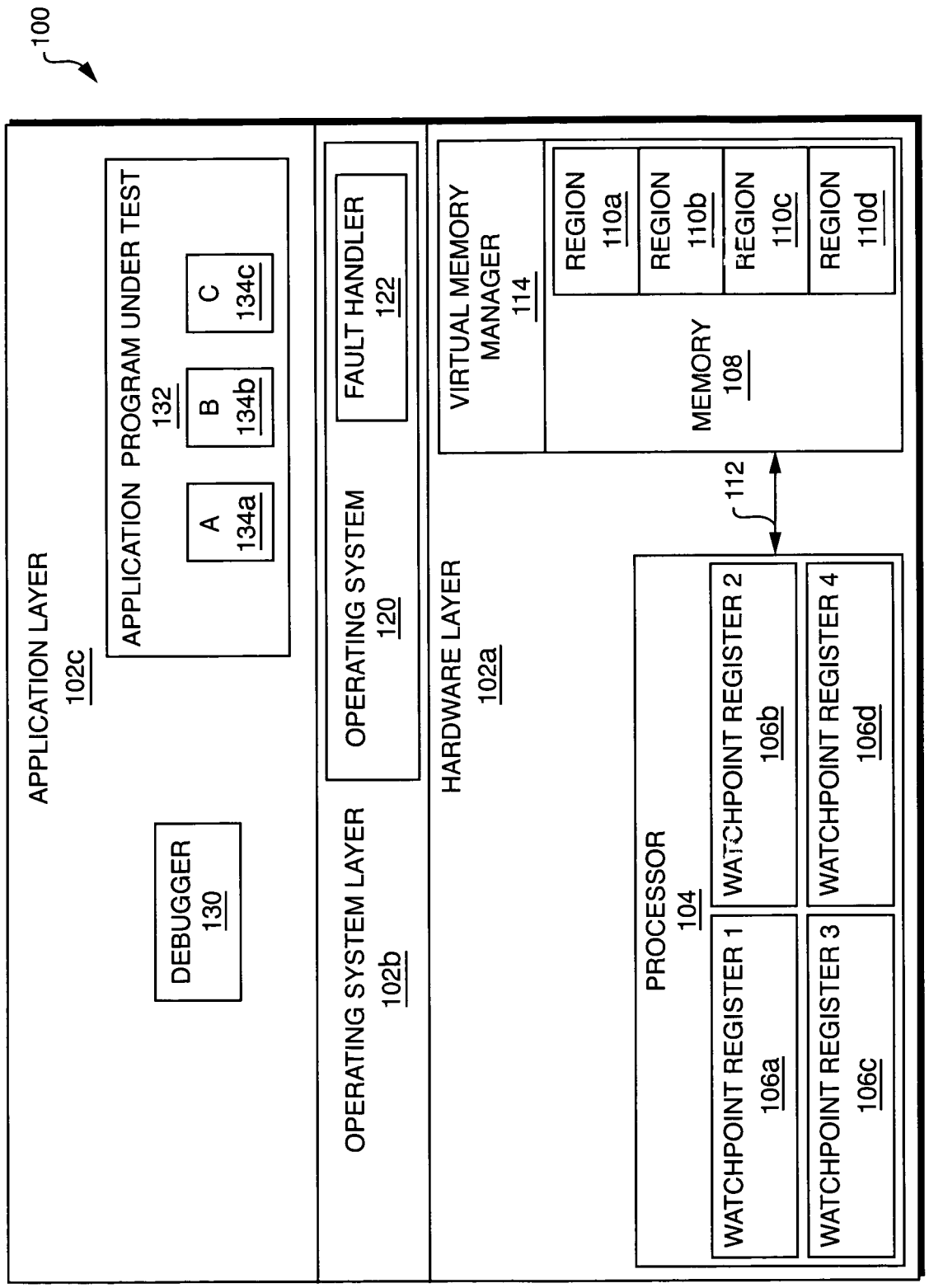
FIG. 1 is a diagram of a computer system according to one embodiment.
Figure 2:
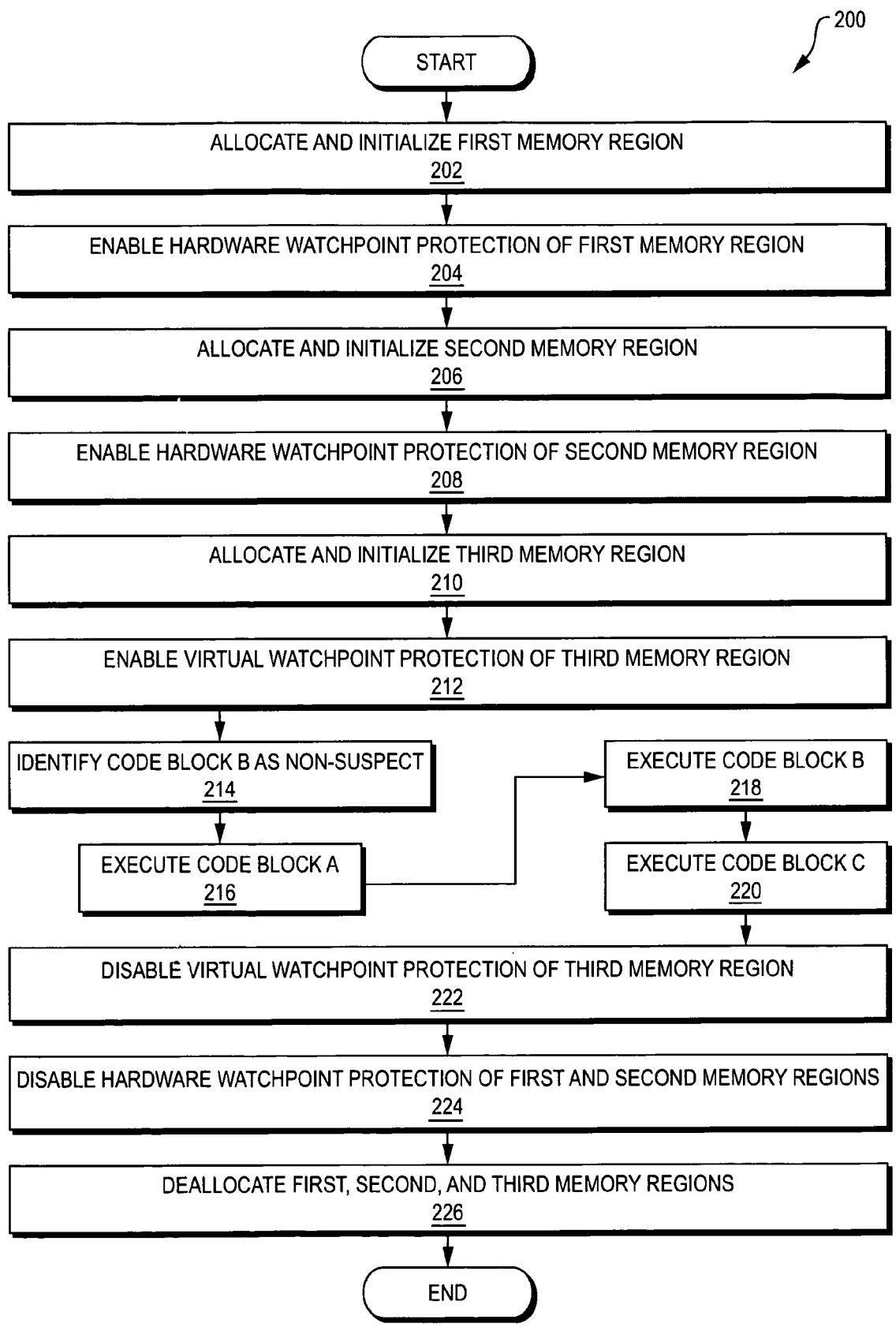
FIG. 2 is a flowchart of a method that is performed by the system of FIG. 1 to facilitate the process of debugging a computer program according to one embodiment.

Having generally described embodiments of the present invention, embodiments of the present invention will now be described in more detail. Referring to FIG. 1, a diagram is shown of a computer system 100 according to one embodiment. Referring to FIG. 2, a flowchart is shown of a method 200 that is performed by the system 100 of FIG. 1 to facilitate the process of debugging a computer program according to one embodiment.

The diagram in FIG. 1 illustrates the computer system 100 using three conceptual layers: a hardware layer 102a, an operating system (OS) layer 102b, and an application layer 102c. It is well-understood by those having ordinary skill in the art that the layers 102a-c in such a layered model do not necessarily represent distinct physical components in the computer system 100, but rather represent a combination of physical and functional models of the hardware and software in the computer system 100 in a manner that is useful for describing the operation of the system 100.

For example, the hardware layer 102a includes a processor 104 and a memory 108. The processor 104 need not be a single physical processor, but rather represents a processing subsystem that may include any number of processors and other components that interact to provide processing resources to the computer system 100. The processor 104 includes, among other things, a set of watchpoint registers 106a-d. Examples of processors that provide hardware watchpoints include the Intel x86 (a.k.a. IA32) line of processors and the Intel Itanium® line of processors. Although four watchpoint registers 106a-d are shown in FIG. 1, the processor 104 may include any number of watchpoint registers. Assume for purposes of example that a watchpoint for a first memory region may be enabled by storing the addresses of the lower and upper boundaries of the first memory region in the first and second watchpoint registers 106a and 106b, respectively. Similarly, assume for purposes of example that a watchpoint for a second memory region may be enabled by storing the addresses of the lower and upper boundaries of the second memory region in the third and fourth watchpoint registers 106c and 106d, respectively.

The hardware layer 102a also includes memory 108. The memory 108 need not be a single physical memory, but rather represents a contiguous virtual memory space that may be implemented in one or more physical memories. For purposes of example, four memory regions 110a-d are demarcated in FIG. 1. The memory addresses stored in the watchpoint registers 106a-d of the processor 104 refer to memory locations in the memory 108. The hardware layer 102a includes a virtual memory manager 114 acts as an interface between the memory 108 and other components of the computer system 100, such as the operating system layer 102b. Requests to access the memory 108 are serviced by the virtual memory manager 114.

The processor 104 and memory 108 communicate with each other over a bidirectional system bus 112. The processor 104 may read from and write to memory locations in the memory 108 over the system bus 112.

The computer system 100 also includes operating system layer 102b. The operating system layer 102b is a software layer that includes an operating system 120. The operating system 120 may be any operating system, such as the Microsoft Windows Server 2003 operating system or any variant of the Linux operating system. The operating system 120 includes a fault handler 122 for servicing traps and other kinds of faults generated by the hardware layer 102a. For example, and as will be described in more detail below, the operating system fault handler 122 is notified when a watchpoint-protected memory region is accessed.

The computer system 100 also includes an application layer 102c that includes one or more application programs. In general, the operating system layer 102b acts as an intermediary between the application layer 102c and the hardware layer 102a. In the embodiment illustrated in FIG. 1, the application layer 102c includes two application programs: a debugger 130 and an application program under test 132. The application program 132 may be any application program that is being debugged by the debugger 130. The debugger 130 may be any debugger, such as the Microsoft WinDBG debugger or the GNU Project debugger (GDB).

Figure 3:
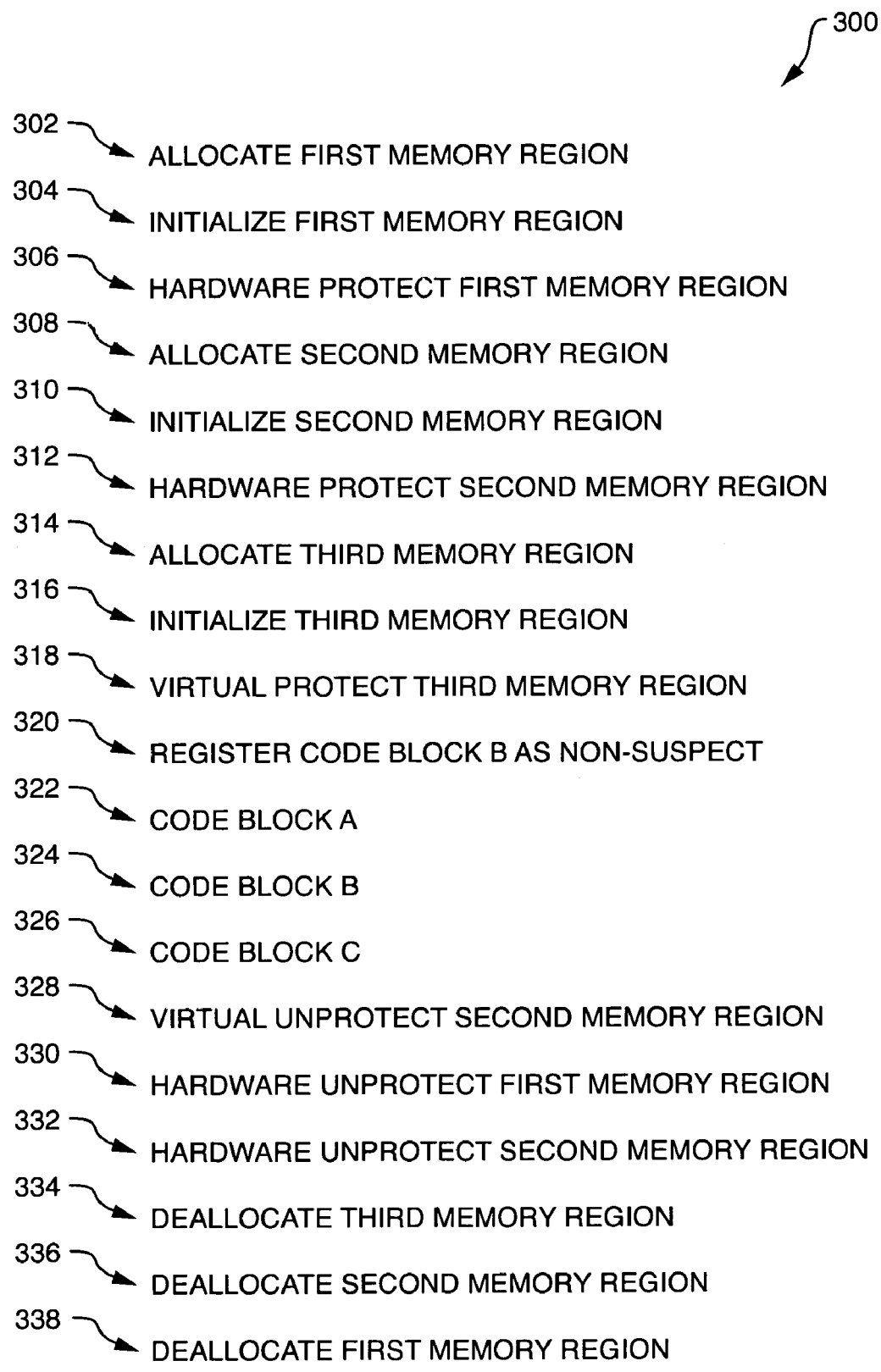
FIG. 3. is a diagram of an example of pseudo-code representing instructions in the program under test in the system of FIG. 1 according to one embodiment.

Referring to FIG. 3, a diagram is shown of an example of pseudo-code 300 representing instructions in the program under test 132. The pseudo-code may 300 may be implemented in any suitable programming language. Note that although individual elements in the pseudo-code 300 may be referred to herein as "instructions," each such "instruction" may be implemented as one or more instructions in a particular programming language.

In the embodiment that will now be described, a human programmer or other operator of the computer system 100 has observed that the program under test 132 corrupts memory regions 110a-c of the memory 108 when the program 132 is executed. The human operator does not, however, know which instruction or instructions in the program 132 are causing the memory corruption.

More specifically, assume for purposes of example that the program under test 132 includes, among other things, three blocks of code 134a-c, referred to herein as Code Block A 134a, Code Block B 134b, and Code Block C 134c. Assume that the human operator does not know whether Code Block A 134a or Code Block C 134c are responsible for corrupting any of the memory regions 110a-c. Assume further that Code Block B 134b accesses memory region 110c and that the human operator believes or knows that Code Block B 134b is not responsible for corrupting memory region 110c.

Because the human operator has observed that the program 132 corrupts memory regions 110a-c, it may be desirable to execute the program 132 with watchpoints enabled for each of regions 110a-c. In other words, it may be desirable to execute the program 132 and for the program 132 to halt whenever a memory location in any of regions 110a-c is accessed by the program 132. Because it is believed, however, that Code Block B 134b accesses region 110c without corrupting region 110c, it is further desirable that a watchpoint not be triggered when Code Block B 134b accesses region 110c.

Watchpoints for regions 110a and 110b may be enabled in hardware by storing the upper and lower boundaries of regions 110a and 110b in hardware watchpoint registers 106a-b and 106c-d, respectively. Once the existing watchpoint registers 106a-d have been used, however, to enable watchpoint protection for memory regions 110a-b, there are no remaining hardware watchpoint registers to enable watchpoint protection for memory region 110c. As will be described in more detail below, in one embodiment this problem is solved by using the virtual memory system of the computer 100 to enable a "virtual watchpoint" for memory region 110c, thereby effectively providing a greater number of watchpoints than is supported directly by the hardware layer 102a of the computer 100.

As will be described in more detail below, the program under test 132 has been provided with instructions which enable a virtual watchpoint to be triggered whenever code in Code Block A 134*a* or Code Block C 134*c* accesses memory region 110*c*, but not when code in Code Block B 134*b* accesses memory region 110*c*. As a result, the program under test 132 may be debugged more effectively because the human operator need not respond to accesses by Code Block B to memory region 110*c*. In summary, the techniques described herein enable an unlimited number of watchpoints to be enabled, and enable such watchpoints to be triggered only by program code that is suspected of containing bugs.

The method 200 shown in FIG. 2 will now be described in more detail. The method 200 is performed by the computer system 100 when the program under test 132 is executed under observation of the debugger 130. When the "Allocate First Memory Region" instruction 302 (FIG. 3) is executed, the operating system 120 (FIG. 1) allocates a first region of the memory 108 for use by the program 132 (FIG. 2, step 202). Assume for purposes of example that region 110*a* is the region that is allocated in step 202. Further assume that a human programmer or other operator of the computer system 100 has previously identified the memory region 110*a* as a region that is corrupted by the program 132 when the program 132 is executed.

When the "Initialize First Memory Region" instruction 304 is executed, the operating system 120 initializes the allocated memory region 110*a*, such as by setting the values of all memory locations in the region 110*a* to zero. Conventional operating systems and programming languages provide mechanisms for performing step 202. The instructions 302 and 304 may therefore be implemented using conventional program instructions carried out using well-known procedures.

When the "Hardware Protect First Memory Region" instruction 306 is executed, the operating system 120 enables hardware watchpoint protection of the memory region 110*a* (step 204). The phrase "hardware watchpoint protection of a memory region" refers herein to associating a watchpoint with the memory region, so that accessing the memory region will trigger a fault or other mechanism whereby control is transferred to the operating system fault handler 122. Hardware watchpoint protection may, for example, be enabled in step 204 by the operating system 120 by storing the addresses of the lower and upper boundary of the memory region 110*a* in a pair of watchpoint registers (such as the watchpoint registers 106*a-b*) in the processor 104.

In one embodiment, the operating system 120 provides a function call that may be called by the program 132 to enable watchpoint protection of the memory region 110*a*. The "Hardware Protect First Memory Region" instruction 306 may be implemented using such a function call. The "Hardware Protect First Memory Region" function call may, for example, take three arguments: the lower and upper bounds of the memory region to be protected, and an identifier of the pair of watchpoint registers in which these bounds are to be stored. When the program 132 calls the "Hardware Protect First Memory Region" function, the operating system 120 stores the specified lower and upper memory bounds in the specified pair of watchpoint registers. Watchpoint protection may alternatively be enabled in any of the ways disclosed in the above-referenced patent application entitled "Debugging Using Watchpoints."

The "Allocate Second Memory Region" 308, "Initialize Second Memory Region" 310, and "Hardware Protect Second Memory Region" 312 instructions may be executed in steps 206-208 in the manner described above for instructions 302-306, except applied to the second memory region 110*b*. After executing instructions 308-312, the second memory region 110*b* is protected by a hardware watchpoint implemented using hardware watchpoint registers 106*c-d*.

The "Allocate Third Memory Region" 314 and "Initialize Third Memory Region" 316 instructions may be executed in step 210 in the manner described above for instructions 304-306, except applied to the third memory region 110*c*.

When the next instruction, "Virtual Protect Third Memory Region" 318 is executed, the operating system 120 enables virtual watchpoint protection of the third memory region 110*c* (step 212). The term "virtual watchpoint protection" refers herein to the use of the computer's virtual memory system to emulate watchpoint protection. Conventional virtual memory systems typically provide the ability to protect selected pages of memory against access. If an attempt is made to access a protected page of memory, the virtual memory manager 114 signals a virtual memory trap to the operating system fault handler 122.

In one embodiment, the operating system 120 enables virtual watchpoint protection of the third memory region 110*c* by instructing the virtual memory manager 114 to modify the virtual memory protection of the page(s) containing the third memory region 110*c* so that accesses to the third memory region 110*c* are prohibited. Then, when an attempt is made to access the page(s) containing the protected region 110*c*, the virtual memory manager 114 will signal a trap to the fault handler 122. Examples of techniques that may be used by the fault handler 122 to handle such a trap will be described below with respect to FIG. 5.

When the next instruction, "Register Code Block B as Non-Suspect" 320 is executed, the operating system 120 identifies Code Block B 134*b* as a non-suspect block of code (step 214). A "non-suspect" block of code is one that the human debugger does not suspect of containing the bug under investigation. As described in more detail below, the debugger 130 is not notified of memory accesses by non-suspect blocks of code.

The next portion 322 of the program 132 represents Code Block A 134*a*. Code Block A 134*a* may or may not access the regions of memory 110*a-c*, and the human operator may or may not know whether Code Block A 134*a* accesses memory regions 110*a-c*. Code Block A 134*a* may, for example, be a portion of the program 132 which is suspected of containing a bug that causes one or more of the memory regions 110*a-c* to become corrupted. The processor 104, under control of the operating system 120, executes the instructions in Code Block A 134*a* (step 216). Note that in this embodiment a code block is considered "suspect" (i.e., a possible cause of memory corruption) by default. Because Code Block A 134*a* has not been expressly registered as non-suspect, it is considered suspect in this example. Because Code Block A 134*a* is suspect and virtual watchpoint protection of the memory region 110*a* is enabled while Code Block A 134*a* is executed, a virtual watchpoint will trigger if Code Block A 134*a* accesses any memory location in the memory region 110*c* protected by the virtual watchpoint. (A conventional hardware watchpoint will also trigger if Code Block A 134*a* accesses any memory location in the memory regions 110*a-b* protected by hardware watchpoints.)

If Code Block A 134*a* triggers a virtual watchpoint, the operating system 120 will halt execution of the program 132 and pass control to the debugger 130, which will indicate to the human operator that the watchpoint was triggered by Code Block A 134*a*. The human operator may then use the debugger 130 to attempt to determine whether Code Block A 134*a* is the source of a bug. Example of techniques that may be used to process a virtual watchpoint event will be described below with respect to FIG. 5.

The next portion 324 of the program 132 represents Code Block B 132b. As mentioned above, the human operator knows or believes that Code Block B 132b is not the source of the bug that corrupts memory region 110c. The human operator may, therefore, not want accesses by Code Block B 134b to memory region 110c to trigger a watchpoint and thereby cause execution of the program 132 to halt.

When Code Block B 134b is executed and accesses the memory region 110c (such as by reading from or writing to memory region 110c) (step 218), no fault is signaled to the debugger 130 because Code Block B 134b was previously registered as non-suspect code in step 214. Code Block B 134b may, therefore, access the memory region 110c an unlimited number of times without causing execution of the program 132 to halt and without requiring the human operator to inspect the program 132 or to manually acknowledge the memory access before execution of the program 132 can continue. Effectively disabling watchpoint protection of the memory region 110c during execution of Code Block B 134b therefore saves time and effort on the part of the human operator.

The next portion 326 of the program 132 represents Code Block C 134c. Code Block C 134c may or may not access the regions of memory 110a-c, and the human operator may or may not know whether Code Block C 134c accesses memory regions 110a-c. Code Block C 134c may, for example, be a portion of the program 132 which is suspected of containing a bug that causes one or more of memory regions 110a-c to become corrupted. The processor 104, under control of the operating system 120, executes the instructions in Code Block C 134c (step 220). Because Code Block C 134c has not been expressly registered as non-suspect, it is considered suspect in this example. Because Code Block C 134c is suspect and virtual watchpoint protection of the memory region 110c is enabled while Code Block C 134c is executed, a virtual watchpoint will trigger if Code Block C 134c accesses any memory location in the memory region 110c protected by the virtual watchpoint. (A conventional hardware watchpoint will also trigger if Code Block C 134c accesses any memory location in the memory regions 110a-b protected by hardware watchpoints.)

When the "Virtual Unprotect Third Memory Region" instruction 328 is executed, the operating system 120 disables virtual watchpoint protection of the memory region 110c (step 222), such as by modifying the virtual memory protection of the third memory region 110c to allow accesses to the region 110c. When the "Hardware Unprotect Memory" instructions 330-332 are executed, the operating system 120 disables hardware watchpoint protection of the memory regions 110a-b (step 224), such as by clearing the contents of the hardware watchpoint registers 106a-d. When the "Deallocate Memory" instructions 334-338 of the program 132 are executed, the operating system 120 deallocates the memory regions 110a-c (step 226).

Having described the execution of the code 300 shown in FIG. 3, it can be seen that pre-identifying Code Block B 134b as non-suspect (instruction 320) before executing Code Block B 134b (instruction 324) allows Code Block B 134b to be executed and to access memory region 110c without triggering the virtual watchpoint on memory region 110c. This can result in a considerable time savings to the human operator, particularly if Code Block B 134b accesses the memory region 110c a large number of times.

It should also be appreciated that the use of hardware watchpoints to protect memory regions 110a-b and a virtual watchpoint to protect memory region 110c allows the use of three watchpoints to monitor three memory regions, even though the processor 104 only directly supports the use of two watchpoints to monitor two memory regions. The use of virtual watchpoints therefore allows an unlimited number of watchpoints to be enabled, regardless of the maximum number of watchpoints directly supported by the underlying hardware.

The pseudo-code 300 shown in FIG. 3 may represent pre-existing code in which the human operator has inserted: (1) the "Protect Memory" instructions (306, 312, 318) and the "Unprotect Memory" instructions (328, 330, 332) at appropriate locations, such that hardware watchpoints are enabled for memory regions 110a-b and a virtual watchpoint is enabled for memory region 110c during execution of the program 132; and (2) the "Register Non-Suspect Code" instruction 320, such that accesses to memory region 110c by Code Block B 134b do not trigger a virtual watchpoint. The same strategy of inserting "Protect Memory," "Unprotect Memory," and "Register Non-Suspect Code" instructions may be applied in any code to enable virtual watchpoints while suspicious code blocks are executing, and to disable virtual watchpoints while bug-free (non-suspect) code blocks are executing.

FIG. 4 shows a table 400 illustrating the effect of using the method 200 of FIG. 2 to facilitate debugging in the circumstances described above. The table 400 has three rows 410, 412, and 414, which indicate the outcome of executing Code Blocks A 134a, B 134b, and C 134c, respectively. More specifically, the table 400 indicates whether the virtual watchpoint protecting memory region 110c is triggered by the execution of code blocks 134a-c.

The table 400 has the following columns: (1) "Code Block" 402, indicating the block of code being executed; (2) "Region Accessed?" 406, indicating whether the memory region 110c is accessed by the corresponding block of code; (3) "Code Suspect?" 406, indicating whether the block of code being executed is suspected of containing a bug that corrupts the memory region 110c; and (4) "Watchpoint Triggered?" 408, indicating whether the corresponding block of code triggers a watchpoint for memory region 110c.

Consider the first row 410, representing the outcome of executing Code Block A 134a. In the present example, Code Block A 134a does not access memory region 110c, as indicated in column 404. Therefore, although Code Block A 134a is suspect (as indicated in column 406), the execution of Code Block A 134a does not trigger the virtual watchpoint for memory region 110c in the present example (as indicated in column 408) because Code Block A 134a does not access memory region 110c.

Now consider the second row 412, representing the outcome of executing Code Block B 134b. In the present example, Code Block B 134b accesses memory region 110c, as indicated in column 404. This access does not, however, trigger the virtual watchpoint for memory region 110c (as indicated in column 408), because Code Block B 134b is not suspected of containing a bug that corrupts memory region 110c (as indicated in column 406).

Finally, consider the third row 414, representing the outcome of executing Code Block C 134c. In the present example, Code Block C 134c accesses memory region 110c, as indicated in column 404. This access triggers the virtual watchpoint for memory region 110c (as indicated in column 408) because Code Block C 134c is suspected of containing a bug that corrupts memory region 110c (as indicated in column 406).

Figure 5:
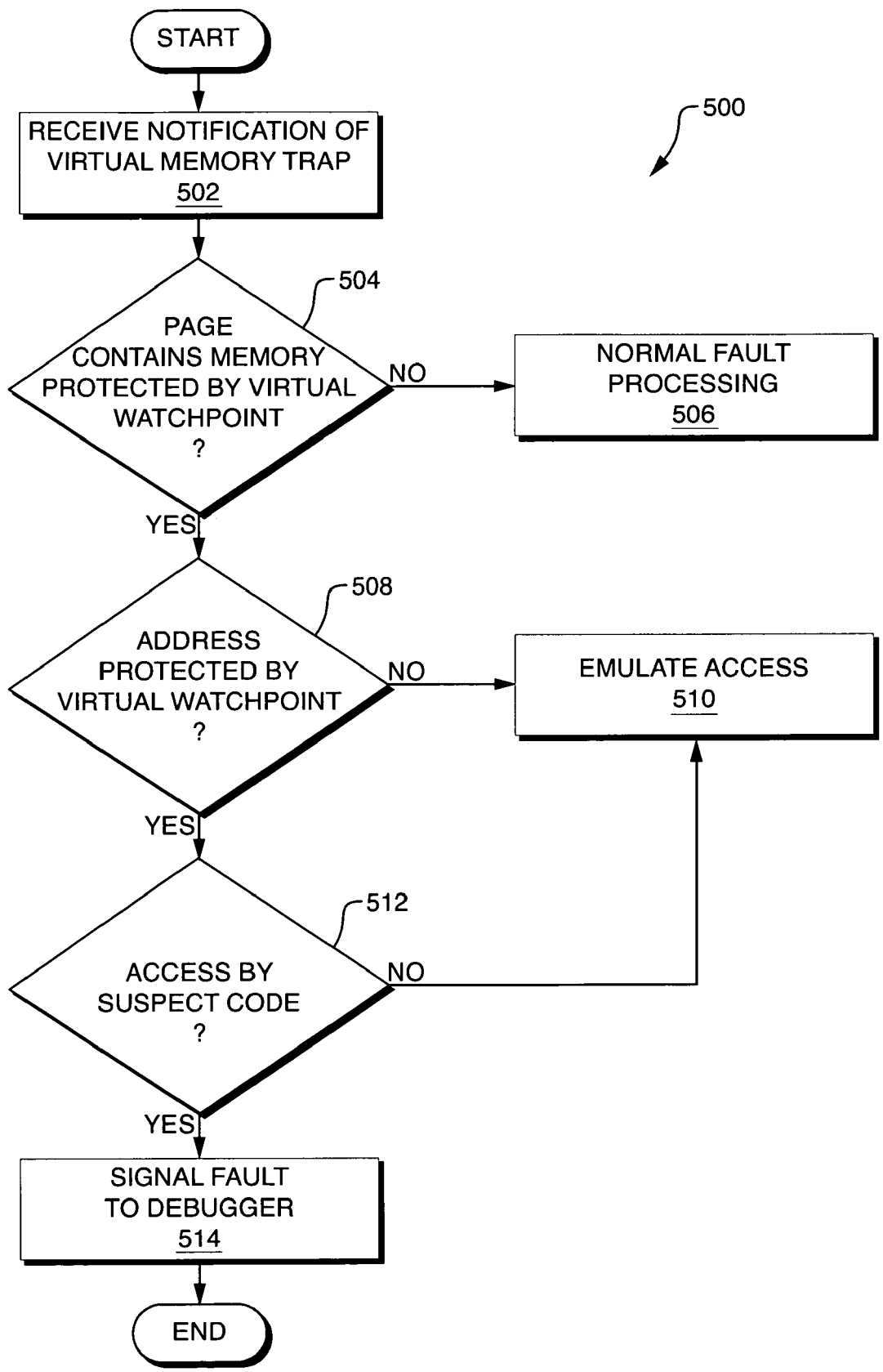
FIG. 5 is a flowchart of a method that is performed by an operating system fault handler to implement virtual watchpoints in one embodiment.

The description above states that the operating system fault handler 122 (FIG. 1) may process virtual memory traps and watchpoint traps generated by the hardware layer 102a to implement virtual watchpoints in the manner described. Referring to FIG. 5, a flowchart is shown of a method 500 that is performed by the operating system fault handler 122 to implement virtual watchpoints in one embodiment.

The fault handler 122 receives notification of a virtual memory trap (step 502). Such notification may be provided to the fault handler 122 by the virtual memory manager 114 in any of a variety of circumstances. One such circumstance is when the program 132 accesses any region in the memory 108 for which the virtual memory protection has previously been modified to prohibit access. As described above, the virtual memory protection of memory region 110c may be modified in this way in step 212 of method 200 (FIG. 2) to enable virtual watchpoint protection of memory region 110c.

The fault handler 122 determines whether the virtual memory page that was accessed is a page containing any regions currently protected by a virtual watchpoint (step 504). Recall that a virtual watchpoint for a memory region may be implemented by modifying the virtual memory protection for that region to prohibit accesses to the region. Such modification of virtual memory protection may be performed by the operating system 120 (e.g., in step 212), which may make the addresses of the protected memory region available to the operating system fault handler 122, such as by storing the addresses in a table in the operating system layer 102b. The operating system fault handler 122 may then access such a table in step 504 to determine whether the virtual memory page that triggered the virtual memory trap contains any memory locations protected by a virtual watchpoint.

If the page that triggered the virtual memory trap does not contain any memory locations protected by a virtual watchpoint, the fault handler 122 performs normal fault processing on the virtual memory trap (step 506). Techniques for performing normal fault handling are well-known to those having ordinary skill in the art. If the page that triggered the virtual memory trap does contain one or more memory locations protected by a virtual watchpoint, the fault handler 122 determines whether the specific memory location whose access triggered the virtual memory trap is protected by a virtual watchpoint (step 508). The fault handler 122 may make this determination by, for example, referencing the table of protected memory locations described above.

If the specific memory location whose access triggered the virtual memory trap is not protected by a virtual watchpoint, the fault handler 122 emulates access to the memory location (step 510). Techniques for emulating memory access are well-known to those having ordinary skill in the art.

If the specific memory location whose access triggered the virtual memory trap is protected by a virtual watchpoint, the fault handler 122 determines whether the virtual memory trap was caused by suspect code (step 512). The notification received in step 502 indicates which program code caused the virtual memory trap. The fault handler 122 may, therefore, make the determination in step 512 by determining whether the code that caused the virtual memory trap was previously identified as non-suspect (e.g., in step 214 of FIG. 2). In the present example, Code Block 134a and 134c are suspect, while Code Block B 134b is non-suspect. If the virtual memory trap was caused by non-suspect code (such as Code Block B 134b in this example), the fault handler 122 emulates access to the memory location whose access caused the virtual memory trap (step 510).

If the virtual memory trap was caused by suspect code (such as Code Blocks 134a or 134c in this example), the fault handler 122 signals a fault to the debugger 130 (step 514), thereby halting execution of the program. The operator of the debugger 130 may then use the debugger in an attempt to identify the cause of the memory corruption under investigation. By halting execution of the program 132 only if a memory location is protected by a virtual watchpoint (steps 504, 508) and is accessed by suspect code (step 512), the method 500 ensures that program execution is not halted when it is unnecessary to bring a memory access to the attention of the (human) debugger. The method 500 may be performed in conjunction with techniques for implementing hardware watchpoints, such as those disclosed in the above-referenced patent application entitled "Debugging Using Watchpoints."

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

The description above states that a virtual watchpoint may be implemented for a memory region by modifying the virtual memory protection for that region to prohibit accesses to the region. Such modification of virtual memory protection may be performed in any of a variety of ways that may vary depending on the implementation details of the virtual memory system in the computer 100. In general, virtual memory systems include a page table that includes protection bits for each physical page of memory. Virtual memory protection for a page of memory may, for example, be modified by setting the corresponding protection bits to disallow writes to and/or reads from the page.

Although code blocks are considered to be suspect by default in the examples described above, this is not a requirement of the present invention. Code blocks may, for example, be considered non-suspect by default, in which case suspect (rather than non-suspect) code blocks may be pre-identified to ensure that virtual watchpoints are triggered when such code blocks access memory regions that are protected by virtual watchpoints.

The elements of the computer system 100 shown in FIG. 1 are provided merely for purposes of example and do not constitute a limitation of the present invention. Techniques disclosed herein may be used in conjunction with computer systems having elements other than those shown in FIG. 1.

Techniques disclosed herein may be used in conjunction with any kind of hardware/virtual watchpoints. For example, processors typically allow the user to specify whether a particular watchpoint is to be triggered: (1) whenever a memory region is accessed; (2) only when the memory region is read; (3) only when the memory region is written; or (4) only when the memory region is executed. Techniques disclosed herein may be used in conjunction with hardware and virtual watchpoints having these and other features.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. In a computer system, wherein the computer system comprises a processor including a plurality of watchpoint registers supporting a maximum number of hardware watchpoints, a computer-implemented method comprising:
   using the processor watchpoint registers to set the maximum number of hardware watchpoints in the processor on a plurality of regions of memory in the computer system;
   expressly registering non-suspect computer program code, wherein access to a region of memory identified as protected against access by said non-suspect computer code does not trigger a virtual memory trap;
   executing a computer program code on an operating system of said computer system, wherein said computer program code comprises the expressly registered non-suspect computer program code and default computer program code identified as suspect;
   receiving notification of the virtual memory trap;
   determining whether the virtual memory trap was triggered by an access to the region of memory identified as protected against access;
   if it is determined that the virtual memory trap was triggered by an access to the region of memory identified as protected against access, determining whether the virtual memory trap was triggered by the execution of the default computer program code identified as suspect; and
   if it is determined that the virtual memory trap was triggered by execution of the default computer code identified as suspect, halting the execution of the computer program code on the operating system, signaling a fault to a debugger and passing control to the debugger executing on the computer system.

2. The method of claim 1, wherein the operating system comprises a fault handler, and wherein the fault handler performs the method comprising:
   receiving notification of a virtual memory trap;
   determining whether the virtual memory trap was triggered by an access to a region of memory identified as protected against access;
   if it is determined that the virtual memory trap was triggered by an access to a region of memory identified as protected against access, determining whether the virtual memory trap was triggered by execution of computer program code identified as suspect; and
   if it is determined that the virtual memory trap was triggered by execution of computer code identified as suspect, signaling a fault to a debugger executing on the computer system.

3. The method of claim 1, further comprising:
   prior to receiving notification of a virtual memory trap, modifying virtual memory protection for the memory region to protect the memory region against access.

4. The method of claim 3, wherein modifying virtual memory protection for the memory region to protect the memory region against access comprises:
   modifying virtual memory protection for the memory region to protect the memory region against writing.

5. The method of claim 3, wherein modifying virtual memory protection for the memory region to protect the memory region against access comprises:
   modifying virtual memory protection for the memory region to protect the memory region against reading.

6. The method of claim 3, wherein modifying virtual memory protection for the memory region to protect the memory region against access comprises:
   modifying virtual memory protection for the memory region to protect the memory region against execution.

7. The method of claim 3, further comprising:
   prior to receiving notification of a virtual memory trap, registering the computer program code as suspect with a fault handler in the computer system.

8. The method of claim 1, wherein the plurality of regions of memory do not include the region of memory identified as protected against access.

9. In a computer system, an apparatus comprising:
   registering means for expressly registering non-suspect computer program code, wherein access to a region of memory identified as protected against access by said non-suspect computer code does not trigger a virtual memory trap;
   executing means for executing a computer program code on an operating system of said computer system, wherein said computer program code comprises the expressly registered non-suspect computer program code and default computer program code identified as suspect;
   means for receiving notification of the virtual memory trap;
   first determination means for determining whether the virtual memory trap was triggered by an access to the region of memory identified as protected against access;
   second determination means for determining whether the virtual memory trap was triggered by default computer program code identified as suspect if it is determined that the virtual memory trap was triggered by an access to a the region of memory identified as protected against access;

signaling means for signaling a fault to a debugger executing on the computer system if it is determined that the virtual memory trap was triggered by execution of the default computer code identified as suspect;

halting means for halting the execution of the computer program code on the operating system;

control passing means for passing control of the execution of the computer program code from the operating system to the debugger;

a processor including a plurality of watchpoint registers supporting a maximum number of hardware watchpoints; and means for using the watchpoint registers to set the maximum number of hardware watchpoints on a plurality of regions of memory in the computer system.

10. The apparatus of claim 9, wherein the operating system comprises a fault handler, and wherein the fault handler includes the means for receiving, the first determination means, the second determination means, and the signaling means.

11. The apparatus of claim 9, further comprising:
means for modifying virtual memory protection for the memory region to protect the memory region against access.

12. The apparatus of claim 11, further comprising:
means for registering the computer program code as suspect with a fault handler in the computer system.

13. The apparatus of claim 9, wherein the plurality of regions of memory do not include the region of memory identified as protected against access.

14. A computer-readable medium storing tangibly-embodied computer program instructions for execution in a computer system wherein the computer system comprises a processor including a plurality of watchpoint registers supporting a maximum number of hardware watchpoints, the computer program instructions comprising:

instructions for expressly registering non-suspect computer program code, wherein access to a region of memory identified as protected against access by said non-suspect computer code does not trigger a virtual memory trap;

instructions for executing a computer program code on an operating system of said computer system, wherein said computer program code comprises the expressly registered non-suspect computer program code and default computer program code identified as suspect;

instructions for receiving notification of the virtual memory trap;

first determination instructions for determining whether the virtual memory trap was triggered by an access to the region of memory identified as protected against access;

second determination instructions for determining whether the virtual memory trap was triggered by execution of the computer program code identified as suspect if it is determined that the virtual memory trap was triggered by an access to the region of memory identified as protected against access;

signaling instructions for signaling a fault to a debugger executing on the computer system if it is determined that the virtual memory trap was triggered by execution of the default computer code identified as suspect;

halting instructions for halting the execution of the computer program code on the operating system;

control passing instructions for passing control of the computer program code to the debugger; and instructions for using the watchpoint registers to set the maximum number of hardware watchpoints on a plurality of regions of memory in the computer system.

15. The computer-readable medium of claim 14, wherein the operating system comprises a fault handler, and wherein the fault handler includes the instructions for receiving, the first determination instructions, the second determination instructions, and the signaling instructions.

16. The computer-readable medium of claim 14, further comprising:
instructions for modifying virtual memory protection for the memory region to protect the memory region against access.

17. The computer-readable medium of claim 16, further comprising:
instructions for registering the computer program code as suspect with a fault handler in the computer system.

18. The computer-readable medium of claim 14, wherein the plurality of regions of memory do not include the region of memory identified as protected against access.

* * * * *

UNITED STATES PATENT AND TRADEMARK OFFICE
CERTIFICATE OF CORRECTION

| | |
|---|---|
| PATENT NO. | : 7,711,914 B2 |
| APPLICATION NO. | : 11/169235 |
| DATED | : May 4, 2010 |
| INVENTOR(S) | : Greg William Thelen et al. |

Page 1 of 1

It is certified that error appears in the above-identified patent and that said Letters Patent is hereby corrected as shown below:

In column 12, line 66, in Claim 9, after "to" delete "a".

Signed and Sealed this

Twenty-sixth Day of October, 2010

David J. Kappos
*Director of the United States Patent and Trademark Office*